(12) United States Patent
Hoover et al.

(10) Patent No.: US 10,761,974 B2
(45) Date of Patent: Sep. 1, 2020

(54) COGNITIVE MANUFACTURING SYSTEMS TEST REPAIR ACTION

(71) Applicant: International Business Machines Corporation, Armonk, NY (US)

(72) Inventors: Brad Hoover, Austin, TX (US); Rajaram B. Krishnamurthy, Pleasant Valley, NY (US); Michael Lapointe, Saugerties, NY (US); Jayapreetha Natesan, Hopewell Junction, NY (US); Kanayo G. Okonji, Wappingers Falls, NY (US); Chanchal Saha, Beacon, NY (US); Thomas Ward, Highland, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 210 days.

(21) Appl. No.: 15/808,972

(22) Filed: Nov. 10, 2017

(65) Prior Publication Data

US 2019/0146901 A1    May 16, 2019

(51) Int. Cl.
*G06F 11/00* (2006.01)
*G06F 11/36* (2006.01)
(Continued)

(52) U.S. Cl.
CPC ...... *G06F 11/3684* (2013.01); *G06F 11/3692* (2013.01); *G06F 16/338* (2019.01);
(Continued)

(58) Field of Classification Search
CPC .............. G06F 11/079; G06F 11/3684; G06F 11/3692; G06F 11/2733; G06F 11/2263
See application file for complete search history.

(56) References Cited

U.S. PATENT DOCUMENTS 7,409,317 B2    8/2008 Cousin et al.
9,329,962 B2    5/2016 Salame
(Continued)

FOREIGN PATENT DOCUMENTS

WO    03/015004 A2    2/2003
WO    03/015059 A1    2/2003

OTHER PUBLICATIONS

Mell et al.; "The NIST Definition of Cloud Computing—Recommendations of the National Institute of Standards and Technology"; US Department of Commerce—National Institute of Standards and Technology; Sep. 2011; 7 pages.
(Continued)

*Primary Examiner* — Christopher S McCarthy
(74) *Attorney, Agent, or Firm* — Cantor Colburn LLP; Teddi Maranzano

(57) ABSTRACT

Embodiments of the present invention provide a computer-implemented method for generating test plans based on test failure root causes or symptoms. The method generates a heat map of manufacturing process test failures based at least in part on historical test failures and prior repair actions. A database is searched for test failure records that are relevant to user input. Relevant test failure records are prioritized via an index score that is assigned based at least in part on proximity of the relevant test failure records to the user input. Failure records that have an index score that is higher than a threshold value are detected. Unstructured text data of each of the detected failure records is analyzed to identify relevant keywords and relevancy rates. A test solution priority list is displayed, via a GUI, in a window or view that is separate from the heat map.

20 Claims, 7 Drawing Sheets

(51) Int. Cl.
*G06N 5/02* (2006.01)
*G06F 16/35* (2019.01)
*G06F 16/338* (2019.01)
*G06F 16/683* (2019.01)

(52) U.S. Cl.
CPC ............ *G06F 16/35* (2019.01); *G06F 16/683* (2019.01); *G06N 5/02* (2013.01)

(56) References Cited

U.S. PATENT DOCUMENTS

| | | | |
|---|---|---|---|
| 10,121,268 B2* | 11/2018 | Baumecker | G06F 9/30 |
| 2003/0002835 A1 | 2/2003 | Gventer | |
| 2003/0028353 A1 | 2/2003 | Gventer | |
| 2005/0021294 A1 | 1/2005 | Trsar et al. | |
| 2005/0006584 A1 | 3/2005 | Summers | |
| 2008/0270847 A1* | 10/2008 | Connally | G06F 11/273 |
| | | | 714/46 |
| 2010/0039433 A1* | 2/2010 | McGreevy | G05B 23/0267 |
| | | | 345/473 |
| 2010/0083029 A1* | 4/2010 | Erickson | G06F 11/0709 |
| | | | 714/2 |
| 2013/0232094 A1 | 9/2013 | Anderson et al. | |
| 2013/0246430 A1 | 9/2013 | Szucs et al. | |
| 2014/0229409 A1 | 8/2014 | Kaushal et al. | |
| 2015/0309906 A1 | 10/2015 | Salame | |
| 2015/0348294 A1* | 12/2015 | Sridharan | G06F 8/34 |
| | | | 345/440 |
| 2016/0026915 A1* | 1/2016 | Delp | G05B 23/0229 |
| | | | 706/20 |
| 2016/0116892 A1* | 4/2016 | Cheng | G05B 19/048 |
| | | | 700/108 |
| 2016/0370798 A1 | 12/2016 | Georgeson et al. | |
| 2017/0024312 A1 | 1/2017 | Salame | |
| 2017/0148102 A1 | 5/2017 | Franke et al. | |
| 2017/0206127 A1* | 7/2017 | Thompson | G06F 11/0793 |

OTHER PUBLICATIONS

Neumann et al.; "Cognitive, Performance, and Systems Issues for Augmented Reality Applications in Manufacturing and Maintenance"; IEEE Proceedings—Virtual Reality Annual International Symposium, 1998; 8 pages.

Saha et al.; "A decision support system for real-time order management in a heterogeneous production environment"; Elsevier—Expert Systems with Applications (An International Journal) 60; 2016; pp. 16-26.

* cited by examiner

COGNITIVE MANUFACTURING SYSTEMS TEST REPAIR ACTION

BACKGROUND

The present invention generally relates to systems for identifying and resolving manufacturing test failures, and more specifically, to cognitive manufacturing systems for identifying and resolving test repair actions.

Manufacturing systems often employ one or more manufacturing tests as part of a test failure plan. The test plan often requires each test to be applied separately in series. As such, in cases where a test of the test plan fails, the entire test plan may be delayed until the test failure is resolved.

SUMMARY

Embodiments of the present invention provide a computer-implemented method for generating test plans based on test failure root causes or symptoms. A non-limiting example of the method includes generating, by a system comprising one or more processors, a heat map of manufacturing process test failures based at least in part on historical test failures and prior repair actions, in which the heat map is presented to a user via a GUI. The method includes receiving, by the system, a user input via the GUI regarding a test failure of a manufacturing process, in which the user input is received after the heat map is generated. The user input includes structured and unstructured data. The method includes searching, by the system, a database for test failure records that are relevant to the user input and prioritizing the relevant test failure records via an index score based at least in part on proximity of the relevant test failure records to the user input. The method includes detecting, by the system, failure records from the search having an index score that is higher than a threshold value. The method includes analyzing, by the system, unstructured text data of each of the detected failure records to identify relevant keywords and relevancy rates. The method includes generating, by the system, a test solution priority list comprising one or more suggested test repair actions for the test failure based at least in part on the relevant keywords and the relevancy rates. The method includes outputting, by the system, the test solution priority list to the user by at least displaying, by the system via the GUI, the one or more suggested test repair actions in a window that is separate from the heat map.

Embodiments of the invention are directed to a computer program product for generating test plans based on test failure root causes or symptoms, the computer program product comprising a computer readable storage medium having program instructions embodied therewith. The program instructions are executable by a system comprising one or more processors to cause the system to perform a method. A non-limiting example of the method includes generating, by the system, a heat map of manufacturing process test failures based at least in part on historical test failures and prior repair actions, in which the heat map is presented to a user via a GUI. The method includes receiving, by the system, a user input via the GUI regarding a test failure of a manufacturing process, in which the user input is received after the heat map is generated. The user input includes structured and unstructured data. The method includes searching, by the system, a database for test failure records that are relevant to the user input and prioritizing the relevant test failure records via an index score based at least in part on proximity of the relevant test failure records to the user input. The method includes detecting, by the system, failure records from the search having an index score that is higher than a threshold value. The method includes analyzing, by the system, unstructured text data of each of the detected failure records to identify relevant keywords and relevancy rates. The method includes generating, by the system, a test solution priority list comprising one or more suggested test repair actions for the test failure based at least in part on the relevant keywords and the relevancy rates. The method includes outputting, by the system, the test solution priority list to the user by at least displaying, by the system via the GUI, the one or more suggested test repair actions in a window that is separate from the heat map.

Embodiments of the present invention provide a system for generating test plans based on test failure root causes or symptoms. The system includes one or more processors configured to perform a method. A non-limiting example of the method includes generating, by the system, a heat map of manufacturing process test failures based at least in part on historical test failures and prior repair actions, in which the heat map is presented to a user via a GUI. The method includes receiving, by the system, a user input via the GUI regarding a test failure of a manufacturing process, in which the user input is received after the heat map is generated. The user input includes structured and unstructured data. The method includes searching, by the system, a database for test failure records that are relevant to the user input and prioritizing the relevant test failure records via an index score based at least in part on proximity of the relevant test failure records to the user input. The method includes detecting, by the system, failure records from the search having an index score that is higher than a threshold value. The method includes analyzing, by the system, unstructured text data of each of the detected failure records to identify relevant keywords and relevancy rates. The method includes generating, by the system, a test solution priority list comprising one or more suggested test repair actions for the test failure based at least in part on the relevant keywords and the relevancy rates. The method includes outputting, by the system, the test solution priority list to the user by at least displaying, by the system via the GUI, the one or more suggested test repair actions in a window that is separate from the heat map.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
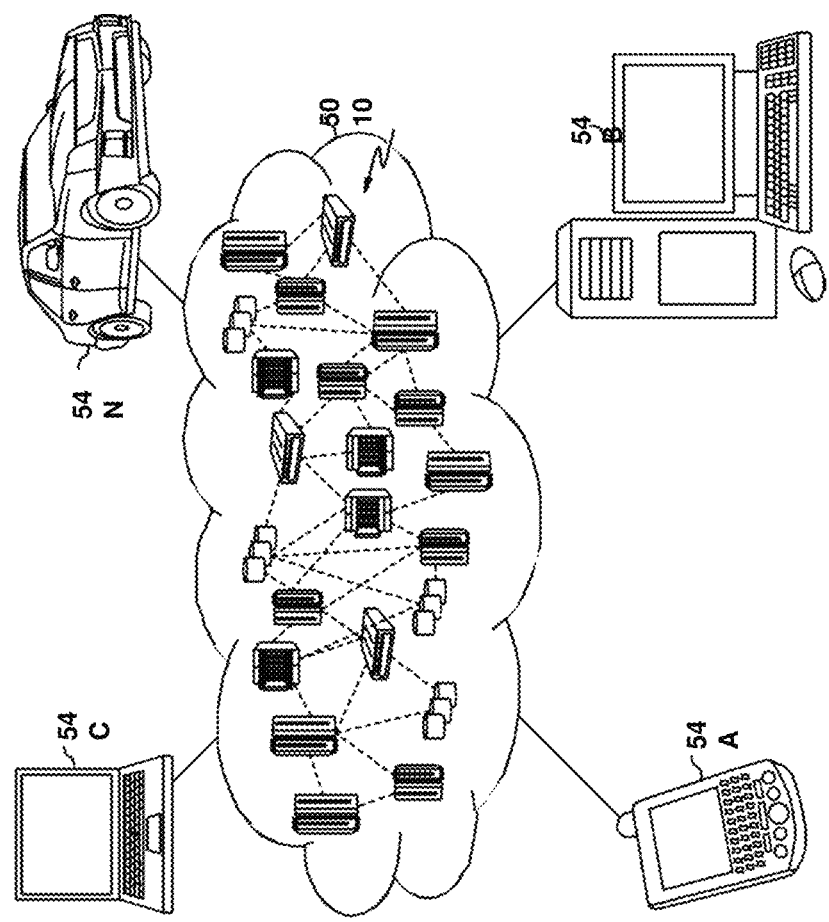
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
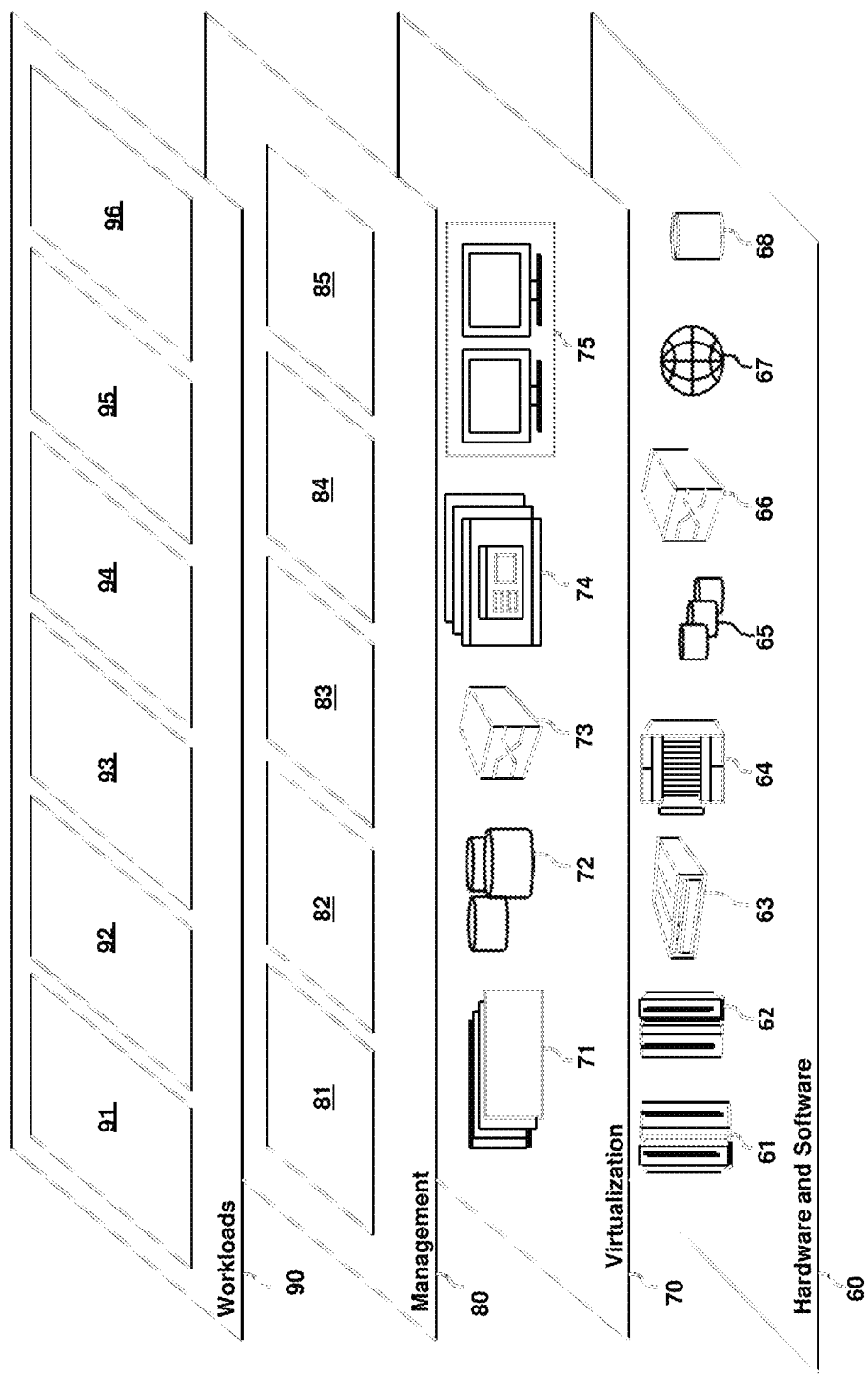
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and manufacturing test failure processing 96.

Turning now to an overview of technologies that are more specifically relevant to aspects of the invention, some manufacturing systems employ one or more tests as part of a test plan, which is to be performed for identifying manufacturing process related failures. Each test of the plan is applied in a series. The process is repeated until all tests of the test plan are completed. However, in cases where a test fails, the test plan sometimes becomes delayed until is the test failure is resolved. The delaying of the test plan causes several technical problems, such as downstream bottlenecks.

Turning now to an overview of the aspects of the invention, one or more embodiments of the invention address the above-described shortcomings of the prior art by providing a cognitive-based system that is capable of analyzing structured and unstructured data to determine possible test failure repair actions. The system is able to analyze previously run tests, planned tests, failure information, and user feedback data to determine the best possible test failure repair actions to take.

One or more embodiments of the present invention provide a cognitive machine learning tool that resolves manufacturing systems test failures by profiling test failures and recommending the next best action(s) via one or more machine learning processes. In some embodiments of the present invention, this includes the ability to identify and propose the best possible test repair actions based on historical data and cognitive learning capability relating to a particular detected quality problem. Cognitive machine learning can be used to identify root causes or symptoms over time for each test failure. In this manner, similar test failures can be automatically assessed and resolved based on previous test results and on feedback stored in a data repository. In some embodiments of the present invention, several variables are accounted for in the allocation of a repair part when resolving a particular problem. In some embodiments of the present invention, the variables include part availability, the cycle time for the repair, quality hold, and the client requested ship date. Each of the variables are weighed within a multi-criteria decision making algorithm that maximizes and prioritizes which repair actions should be completed to optimize the overall manufacturing process. In some embodiments of the present invention, the test plan is automatically re-sequenced to bypass test steps that are impacted by the test failure. For example, in some embodiments of the present invention, rather than simply stopping the test plan pending a repair action, other test steps of the test plan, that are not impacted by the defect part are executed in parallel while a repair action part is being obtained.

Guidance can be provided through machine learning to dynamically adjust the test plan based on previous experience. In some embodiments of the present invention, corrective action is performed automatically without the need of interaction by a test operator. For example, a new microcode update or an automatic re-run of test cases (or sequencing) can be generated using machine learning and experience. In some embodiments of the present invention, structured and unstructured test result data and defect records are utilized to establish relationships or screens between test steps and root causes, in which the relationships indicate the test steps that are likely to fail in the presence of particular root cause. The established relationship knowledgebase can then be expanded to take into account multiple root causes. In some embodiments of the present invention, the relationship knowledge is modified based on current test results or on new information via one or more cognitive engines for machine learning.

The above-described aspects of the invention address the shortcomings of the prior art by applying cognitive techniques to automate the diagnosis of a test failure, which reduces the overall manufacturing cycle time, accelerates the replacement of defective parts, and reduces the quantity of non-defective parts that would have been replaced in error. The systems identified herein can also be applied for use with other products and/or services that have complicated and lengthy test operations. The systems can be used to streamline the test operation steps of manufacturing processes by capturing the vulnerable test steps and providing cognitive solutions for test repair actions.

Figure 3:
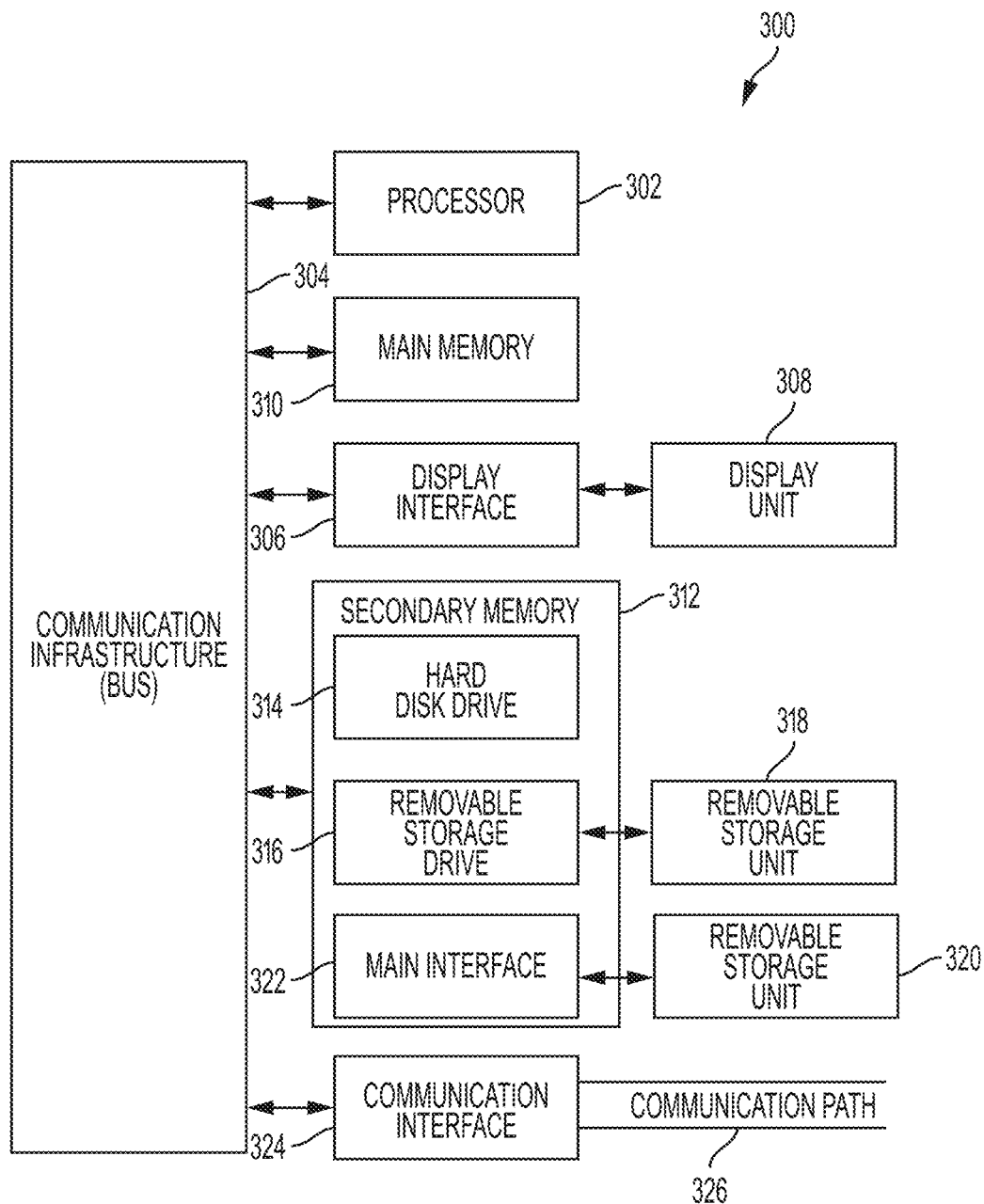
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
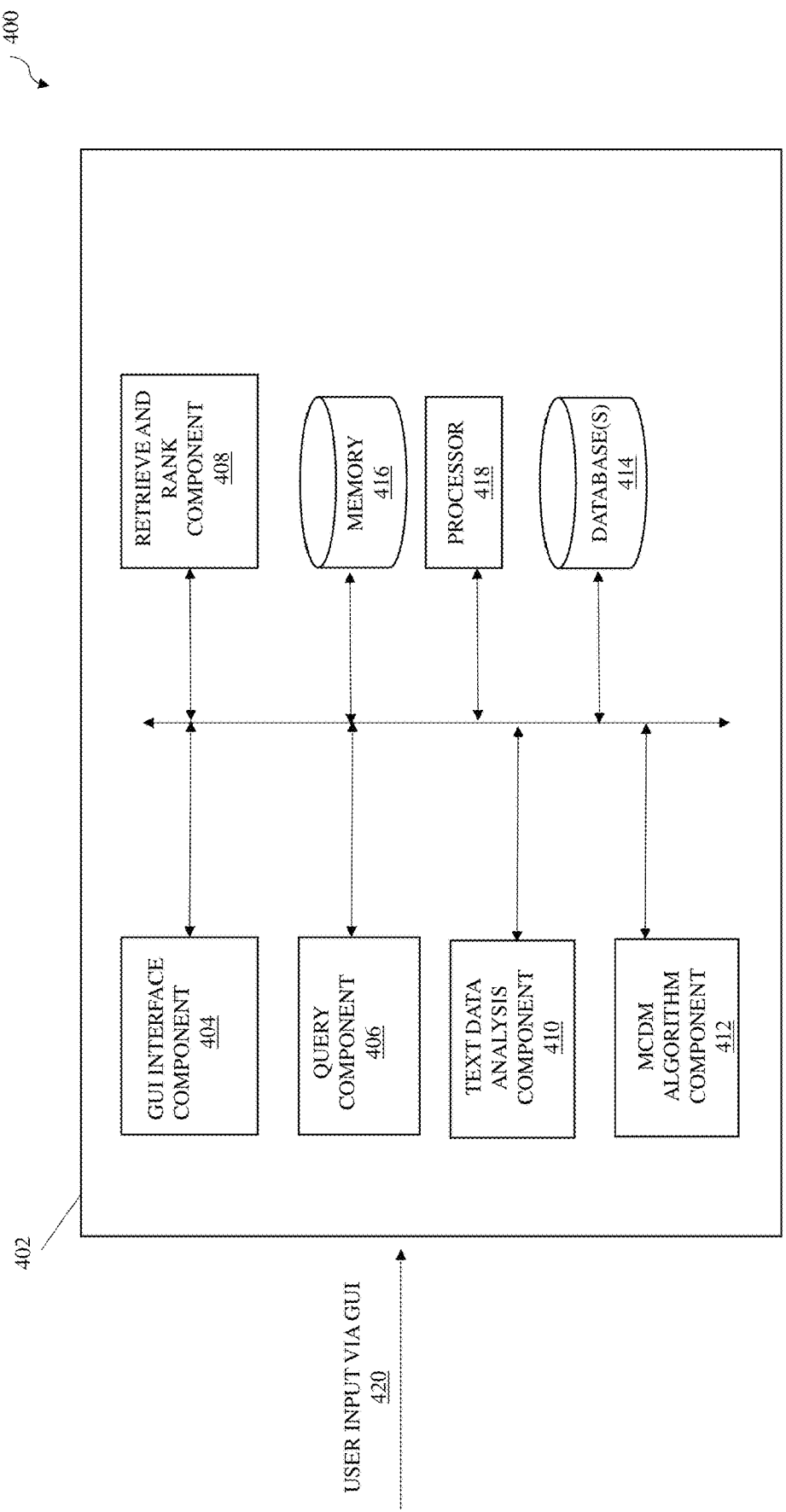
FIG. 4 depicts an exemplary system that facilitates machine learning using in accordance with one or more embodiments of the present invention.

FIG. 4 depicts an example computer system 400 that is capable of implementing one or more embodiments of the present invention in accordance with one or more embodiments of the present invention. System 400 is a machine learning system that can be utilized to solve a variety of technical issues (e.g., learning previously unknown functional relationships) in connection with technologies such as, but not limited to, machine learning technologies, data analytics technologies, data classification technologies, data clustering technologies, recommendation system technologies, signal processing technologies, manufacturing defect and analysis technologies, and/or other digital technologies. System 400 employs hardware and/or software to solve problems that are highly technical in nature, that are not abstract and that cannot be performed as a set of mental acts by a human.

In certain embodiments of the invention, some or all of the processes performed by system 400 are performed by one or more specialized computers (e.g., one or more specialized processing units, a specialized computer with text data component, etc.) for carrying out defined tasks related to machine learning. In some embodiments of the invention, system 400 and/or components of the system are employed to solve new problems that arise through advancements in technologies mentioned above.

In the example shown in FIG. 4, system 400 includes a tool advisor component 402 that includes a GUI interface component 404, a query component 406, a retrieve and rank component 408, a text data analysis component 410, a multi-criteria decision making (MCDM) algorithm component 412, and one or more database(s) 414. In some embodiments of the invention, tool advisor component 402 constitutes machine-executable component(s) embodied within machine(s) (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments of the invention, tool advisor component 402 includes a memory 416 that stores computer executable components and instructions. Furthermore, tool advisor component 402 in some embodiments of the invention includes a processor 418 to facilitate execution of the instructions (e.g., computer executable components and corresponding instructions) by the tool advisor component 402. As shown, the GUI interface component 404, the query component 406, the retrieve and rank component 408, the text data analysis component 410, the multi-criteria decision making (MCDM) algorithm component 412, the database(s) 414, the memory 416, and/or the processor 418 are electrically and/or communicatively coupled to one another in one or more embodiments of the invention.

In general, the tool advisor component 402 is a cognitive-based tool that is capable of diagnosing a root cause and/or symptoms of manufacturing test failures and then recommending one or more corrective course of actions based on structured and unstructured data that is associated with the manufacturing test failure. In some embodiments of the present invention, the tool advisor component 402 is able determine the best possible test failure repair action(s) for a detected manufacturing failure by, for example, analyzing previously run manufacturing systems tests, planned tests, failure information, and/or user feedback data on prior recommended repair actions. The tool advisor component 402 provides a heat map that indicates which steps are more likely to cause a failure or be related to a particular symptom. In the context of a test failure, the tool advisor component 402 in some embodiments generates suggested possible repair actions in response to a user interaction with a heat map presented on a GUI. For example, in some embodiments of the present invention possible repair actions are provided when a user hovers over the heat map with a mouse cursor or touch screen of the computer, and the suggested action(s) may then be provided with supporting keywords. In some embodiments of the present invention, the GUI provides prioritized recommendations based on the user inputs for repair actions, with repair cycle time for each recommendation. The GUI may also attach test logs to support the recommendation to assist test technicians.

In order to resolve a test failure, the root cause and/or corrective actions may be ascertained. In general, to analyze and resolve test failures, the tool advisor component 402, in certain embodiments of the present invention, identifies critical attributes that are characteristic of a test failure and repair actions that are associated with the test failure via a machine learning service, such as for example, through the use of IBM Watson®. A GUI is generated that allows a test technician to find test failures during a test processor, in which the user is able to provide a set of attributes and a user comment to the system via the GUI. In some embodiments of the present invention, the attributes include a combination of brand, machine type, machine model, commodity, modifier, defect code, operation number, operation step, and user comment fields. The tool advisor component 402 in certain embodiments is configured to utilize machine learning APIs (e.g., IBM Watson® APIs such as the Retrieve and Rank™ API and AlchemyAPI® that are provided by IBM®), and MCDM algorithm(s) to identify one or more best possible solutions, as will be discussed in further detail below.

Figure 6:
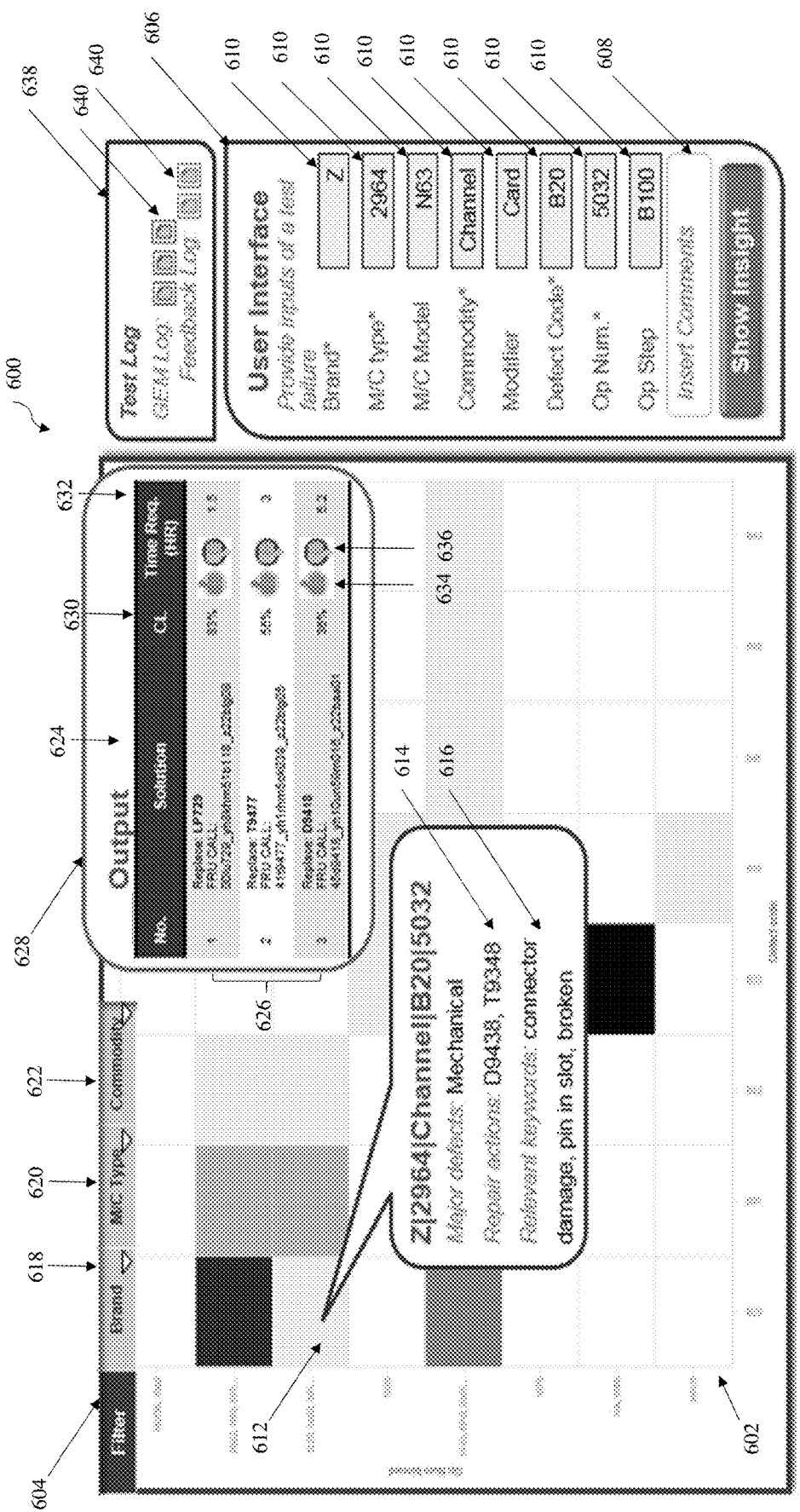
FIG. 6 depicts an example GUI in accordance with one or more embodiments of the present invention.

The GUI interface component 404 of the tool advisor component 402 is configured to generate a heat map pertaining to manufacturing process test failures, in which the heat map is based at least in part on historical test failures and prior repair actions. The heat map is presented to a user via a GUI that is generated by the GUI interface component 404. After the heat map is generated, the tool advisor component 404 receives a user input 420 via the GUI regarding a test failure of a manufacturing process. In some embodiments of the present invention, the GUI generated by the GUI interface component 404 has multiple windows and/or views. FIG. 6 depicts an example GUI 600 in accordance with one or more embodiments of the present invention.

As shown in FIG. 6, in some embodiments of the present invention, the GUI 600 includes a heat map 602 that is presented in the GUI 600 via a first window and/or view 604. The heat map 602 includes a grid comprising a plurality of color-coded cells. In some embodiments of the present invention, each color-coded cell of the plurality of color-coded cells is associated with a different respective operation number and defect code pair. In some embodiments of the present invention, the GUI 600 includes a second window and/or view 606 that is configured to receive an input from a user (e.g., GUI input 420). The input may include various attributes pertaining to a detected test failure of a manufacturing process that are entered by the user via various fields 608, 610. In some embodiments the present invention, the GUI's second window and/or view 606 includes a user comment field 608 and at least one or more of the following fields 610: a brand, a machine type, a machine model, a commodity, a modifier, a defect code, an operation number, an operation step. The user input includes structured and unstructured data, in which the structured data includes the attributes obtained from the various attribute fields 610, and the unstructured data includes text that is obtained from the user comment field 608. In some embodiments of the present invention, the heat map 602 provides a representation that includes, for each operation number defect code pair, the frequency of failure occurrence 612, repair actions 614, and relevant keywords 616 that are proposed for a brand 618, machine type 620, and commodity 622. In some embodiments of the present invention, the frequency of failure occurrence 612 is represented by a color that is indicative of the relative frequency of occurrence of that particular operation number and defect code pair. In some embodiments of the present invention, the frequency of failure arrogance 612 is additionally or alternatively presented via text.

In some embodiments of the present invention, the GUI 600 (e.g., interface component 404) outputs a test solution priority list 624 that includes one or more suggested test repair actions 626 as identified by the system 400. In some embodiments of the present invention, the one or more suggested test repair actions 626 are presented in a window and/or view 628 that is separate and/or distinct from the heat map 602. In some embodiments of the present invention, the priority list 624 further includes, for each of the one or more suggested test repair actions 626, a confidence level 630 and a time required to implement a respective proposed solution 632.

In some embodiments of the present invention, a user may provide feedback via the GUI 600 regarding the proposed test repair actions that are presented to the user. In some embodiments of the present invention, the feedback is provided via the clicking or selecting of a thumbs up 634 or a thumbs down symbol 636. In some embodiments of the present invention, the feedback is used to gather information from the user regarding if a repair action that was displayed in the priority list was successful or unsuccessful. For example, the thumbs up 634 may be clicked or selected by the user upon identifying that a repair action of the priority list was successful, and the thumbs down 636 may be clicked or selected by the user upon identifying that a repair action of the priority list was unsuccessful. The feedback can be incorporated into machine learning (e.g., deep machine learning supervised or unsupervised algorithms) to improve future recommendation results. In some embodiments of the present invention, the GUI 600 further includes a test log window 638. In some embodiments of the present invention, the test log window 638 is a separate and/or distinct view and/or window from the heat map 602. In some embodiments of the present invention, the test log window 638 includes one or more interactive icons 640 for selecting a particular database for search (e.g., database(s) 414). In some embodiments of the present invention, the one or more interactive icons 640 includes one or more GEM log selection icons and/or one or more feedback log selection icons. In some embodiments of the present invention, the GUI 600 provides the user with supporting documents for one or more repair actions that are displayed in the proposed priority list such as, for example, rework instruction(s), reference material(s) or other suitable supporting information.

Referring back to FIG. 4, the query component 406 is configured to query one or more databases 414 based on the structured and unstructured data that is submitted by the user via the GUI. In some embodiments of the present invention, the query component 406 is configured to query one or more databases 414 to identify test failure and repair action incidents based on the input 420 submitted by the user, such as keywords that are extracted from text of the input 420 that is submitted by the user. In some embodiments of the present invention, the one more of the database(s) 414 that are queried by the query component 406 includes a test log database and/or a defect database, such as a GEM defect database. In some embodiments of the present invention, the one or more databases 414 additionally or alternatively includes a feedback storage database that includes user provided feedback data.

The retrieve and rank component 408 is configured to search for the most relevant test failure records from the queried data and to prioritize the test failure records based on their proximity to the user inputs 420. In some embodiments of the present invention, the retrieve and rank component 408 is configured to utilize a retrieve and rank API type service to perform the searching, such as for example by the Retrieve and Rank™ service provided by IBM®. It should be understood that other suitable methods for searching and prioritizing relevant test failure records may be utilized as known to those having ordinary skill in the art. In some embodiments of the present invention, the retrieve and rank component 408 is configured to search one or more databases 414 for test failure records that are relevant to the user input 420 and to prioritize the relevant test failure records via an index score. In some embodiments of the present invention, in the index scores are assigned to the relevant test records based at least in part on proximity of the relevant test failure records to the user input 420. In some embodiments of the present invention the retrieve and rank component 408 is configured to detect failure records that have an index score that is higher than a threshold index score, in which the index score is indicative of the similarity and/or proximity of the inputs 420 submitted by the user via a GUI for a particular test failure incident as compared to prior test failures. The proximity may be ascertained using a variety of suitable techniques, such as via clustering techniques, nearest neighbors techniques, distance vector techniques, and other methods of similarity or dissimilarity measurement identification. In some embodiments of the present invention, the search of the databases 414 for relevant test failure records is further based at least in part on feedback data that is obtained by querying a feedback storage database (e.g. via query component 406).

The text data analysis component 410 is configured to analyze text data of the records that are identified by the retrieve and rank component 406 (e.g., records that have an index higher than a certain threshold value), to find relevant keywords and relevancy rates. The relevant words are those words that have been found in a particular prior test failure. For example, if a certain set of words is often associated with a certain type of test failure, then those words may be relevant to the test failure that is presently being detected by the user. The system associates the relevant keywords with a respective relevancy rate for the given failure occurrence. In some embodiments of the present invention, the text data analysis component 410 utilizes a machine learning engine and/or API type service, such as for example AlchemyAPI®, to receive records from the retrieve and rank component 406 (e.g., via Retrieve and Rank™ service provided by IBM®) that have a retrieve and rank index score that is higher than a certain threshold value. The text data analysis component 410 then analyzes the test data of those received records to identify relevant keywords and their respective relevancy rates. For example, in some embodiments of the present invention, the text data analysis component 410 is configured to analyze the unstructured text data of each of the detected failure records to identify relevant keywords and relevancy rates.

The text data analysis component 410 is further configured to generate a test solution priority list comprising one or more suggested test repair actions for the test failure, in which the list is generated based at least in part on the relevant keywords and the relevancy rates. In some embodiments of the present invention, the text data analysis component 410 is configured to generate the test solution priority list by at least, for each given detected failure record that includes a relevant keyword that has a relevancy rate of the identified relevancy rates that is above a threshold relevancy rate, identifying a test repair action that is stored in the given detected failure record and then counting the frequency of the test repair action across the detected failure records.

In some embodiments of the present invention, if the proposed solution is a replacement part, the tool advisor component 402 is configured to further query an inventory and production database (e.g., via query component 406) to gather data based on a set of attributes that pertain to the viability of a proposed replacement part solution. For example, in some embodiments of the present invention, a systems applications and products (SAP) database and/or a materials flow system (MFS) database is queried. In some embodiments of the present invention, the SAP and MFS database are within the tool advisory component 402 (e.g., database(s) 414). In some embodiments of the present invention, the set of attributes includes a part availability, a repair cycle time, a repair action difficulty level, a flag on quality hold/stop ship, a requested scheduled ship date (RSSD), and/or a plant scheduled ship date (PSSD).

As noted above, in some embodiments of the present invention, the GUI interface component 404 is configured to output the test solution priority list to the user by at least displaying, by system 400 via the GUI, the one or more suggested test repair actions in a window that is separate and/or distinct from the heat map. In some embodiments of the present invention, outputting the test priority list via the GUI includes displaying, via the GUI, at least one of the respective confidence scores or respective repair cycle times for each of the one or more test repair actions. In some embodiments of the present invention, the at least one of respective confidence scores or respective repair cycle times is displayed within the window that is separate and/or distinct from the heat map. In some embodiments of the present invention, the GUI interface component 404 is configured to output to the user the test solution priority list, feedback inputs, as well as support information and documents.

In some embodiments of the present invention, the tool advisory component is configured to execute one or more multi-criteria decision making (MCDM) algorithms (e.g., via MCDM algorithm component 412) to narrow down the one or more suggest test repair of the test solution priority list based at least in part on a plurality of attributes (e.g., via the querying of the inventory and production database in regards to the set of attributes identified above). For example, in some embodiments of the present invention, the MCDM algorithm component 412 is configured to obtain the proposed solution(s) of the priority list that are generated by a rank and retrieve type API, such as the Retrieve and Rank™ service provided by IBM® (e.g. rank and retrieve component 408), and then to revise the ranking of the proposed solutions in the priority list in view of the identified constraints. As is understood by persons having ordinary skill in the art, various suitable MCDM algorithms may be utilized that can be used to prioritize the proposed solutions based on the importance of the plurality of attributes so that a narrowed down priority list may be outputted via the GUI to a user. One example of a suitable type of MCDM algorithm can be found in Chanchal Saha et al., *A Decision Support System for Real-Time Order Management in a Heterogeneous Production Environment*, EXPERT SYSTEMS WITH APPLICATIONS, Oct. 30, 2015, vol. 50, at 16. The article is incorporated by reference herein in its entirety. In some embodiments of the present invention, the MCDM algorithm component 412 is configured to incorporate manufacturing/inventory constraints (e.g., parts and time availability, requested ship date, and skilled resources attributes), in addition to proposing a revised test solution list that is displayed along with an estimated repair cycle time.

In some embodiments of the present invention, the priority list (e.g., priority list 624) is outputted by the tool advisory component 402 without first executing an MCDM algorithm. In some embodiments of the present invention, the MCDM algorithm is executed only during the occurrence of a set of constraints, such as when there are limited time and long queues for machine testing. In some embodiments of the present invention, the set of constraints includes at least one or more of a time limitation, a resource limitation, an inventory limitation, and/or a technical staff availability limitation.

Figure 5:
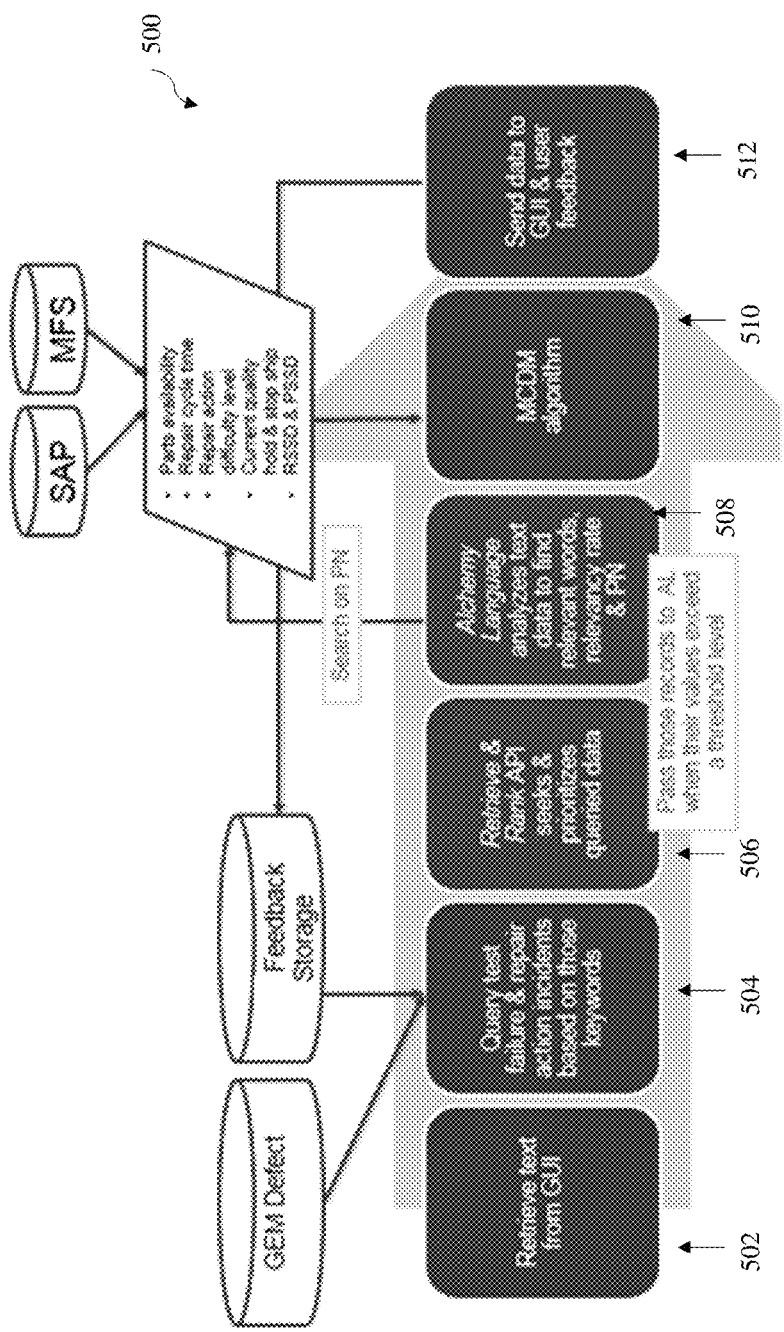
FIG. 5 depicts an example process flow that can be implemented by the system of FIG. 4 in accordance with one or more embodiments the present disclosure.

FIG. 5 depicts one example of a process flow 500 that can be implemented by system 400 of FIG. 4 in accordance with one or more embodiments of the present invention. The process flow 500 describes the performance of steps in a manner similar to the functions identified above in regards to FIG. 4. As shown in FIG. 5, the example process flow 500 receives text input from a GUI from a user at 502. At 504, test failure and repair action incidents are queried based on keywords identified in the text input from the user (e.g., unstructured data from input 420). The querying in this example includes querying a defect database (e.g., a GEM defect database) and a feedback storage database. At 506, the Retrieve and Rank™ API service provided by IBM® is utilized to seek and prioritize the queried data. At 508, AlchemyAPI® is utilized to analyze text data from records that have a retrieve and rank index score that is higher than a certain threshold value. A list of proposed solutions is identified from the analysis of the text data of the obtained records, in which the list of proposed solutions is identified by finding a set of relevant keywords, a relevancy rate, and a part number (PN) for each potential solution. The analysis includes searching a SAP database and a MFS database for a set of attributes that are associated with the part number. The set of attributes includes a part availability, a repair cycle time, a repair action difficulty level, a current quality hold & stop ship, and a RSSD & PSSD. At 510, an MCDM algorithm is executed to narrow down the list of proposed solutions based at least in part on the results of the search of the SAP and MFS database. At 512, the user is sent the resulting priority list that includes the one or more proposed solutions and the user then provides feedback regarding the one or more proposed solutions. The feedback is then stored in the feedback storage database, which can be subsequently used via machine learning to improve the manner in which subsequent proposed solutions are identified by the system.

Figure 7:
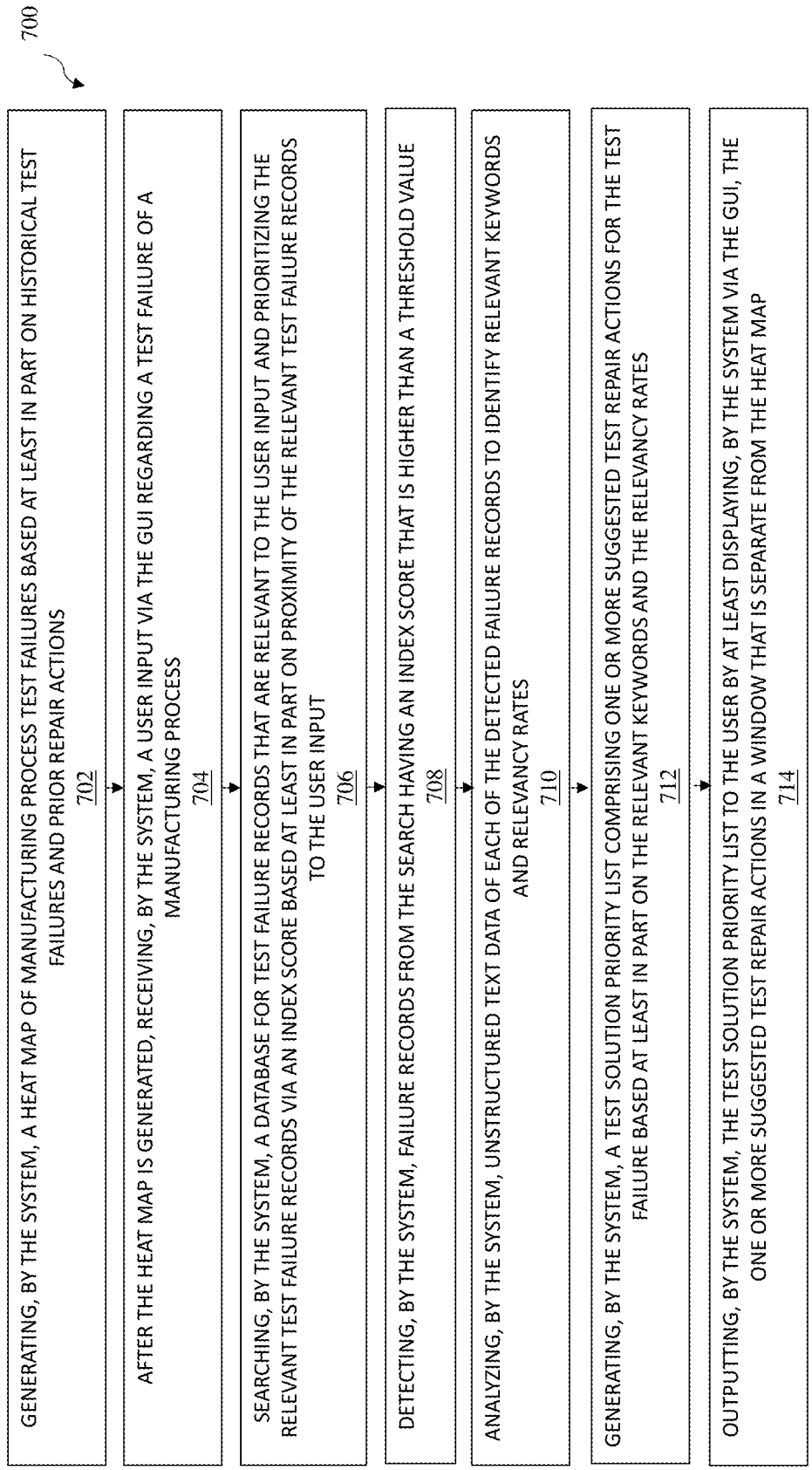
FIG. 7 depicts a flow diagram illustrating a methodology in accordance with one or more embodiments of the present invention.

Additional details of the operation of system 400 will now be described with reference to FIG. 7, wherein FIG. 7 depicts a flow diagram illustrating a methodology 700 according to one or more embodiments of the present invention. At 702, a heat map of manufacturing process test failures is generated based at least in part on historical test failures and prior repair actions, in which the heat map is presented to a user via a GUI. At 704, a user input is received via the GUI regarding the test failure of a manufacturing process, in which the user input is received after the heat map is generated, in which the user input includes structured and unstructured data. At 706, a database is searched for test failure records that are relevant to the user input. The relevant test failure records are then prioritized via an index score, in which the index score is assigned based at least in part on proximity of the relevant test failure records to the user input. At 708, failure records that have an index score that is higher than a threshold value are detected. At 710, unstructured text data of each of the detected failure records is searched to identify relevant keywords and relevancy rates. At 712, a test solution priority list is generated comprising one or more suggested test repair actions for the test failure based at least in part on the relevant keywords and the relevancy rates. At 714, the test solution priority list is outputted to the user by at least displaying, by the system via the GUI, the one or more suggested test repair actions in a window that is separate from the heat map.

In some embodiments of the present invention, structured and unstructured test result data and problem records can be used to establish relationships of screens between test steps and root causes, in which the test steps indicate steps that are likely to fail given the presence of a root cause. In some embodiments of the present invention, the processes identified above (e.g., process flow 500 and methodology 700) can be used to identify symptoms of a test failure rather than a root cause. For example, in some embodiments of the present invention, a root cause may be a subsystem component failure whereas a symptom may be a subsystem failure. In some embodiments of the present invention, by avoiding tests which are related to a subsystem failure, more tests are screened out in comparison tests of a subsystem component failure. Accordingly, depending on the given test scenario, in some embodiments of the present invention, the system is configured to identify a root cause, a system failure screening, or both.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for generating test plans based on test failure root causes or symptoms, the computer-implemented method comprising:
    generating, by a system comprising one or more processors, a heat map of manufacturing process test failures based at least in part on historical test failures and prior repair actions, wherein the heat map is presented to a user via a GUI;
    receiving, by the system, a user input via the GUI regarding a test failure of a manufacturing process, wherein the user input includes structured and unstructured data;
    searching, by the system, a database for test failure records that are relevant to the user input and prioritizing the relevant test failure records via an index score based at least in part on proximity of the relevant test failure records to the user input;
    detecting, by the system, failure records from the search having an index score that is higher than a threshold value;
    analyzing, by a machine learning engine executed by the system, unstructured text data of each of the detected failure records to identify relevant keywords and respective relevancy rates, the machine learning engine previously trained to input a failure record and to output relevant keywords and respective relevancy rates of the failure record;
    generating, by the system, a test solution priority list comprising one or more suggested test repair actions for the test failure based at least in part on the relevant keywords and the relevancy rates; and
    outputting, by the system, the test solution priority list to the user by at least displaying, by the system via the GUI, the one or more suggested test repair actions in a window that is separate from the heat map.

2. The computer-implemented method of claim 1, wherein generating the test solution priority list comprises:
    for each given detected failure record of the detected failure records that includes a relevant keyword of the identified relevant keywords that has a relevancy rate of the identified relevancy rates that is above a threshold relevancy rate, identifying, by the system, a test repair action stored in the given detected failure record; and
    counting, by the system, a frequency of the test repair action across the detected failure records.

3. The computer-implemented method of claim 1, further comprising:
    querying, by the system, a feedback repository to obtain feedback data based on the user input, wherein the search of the database for relevant test failure records is further based at least in part on the obtained feedback data.

4. The computer-implemented method of claim 1, wherein the outputting of the test solution priority list via the GUI further comprises:
    displaying, by the system via the GUI, at least one of a respective confidence score or respective repair cycle time for each of the one or more test repair actions, wherein the at least one of a respective confidence score or respective repair cycle time is displayed within the window that is separate from the heat map.

5. The computer-implemented method of claim 1 further comprising:
    executing, by the system, a multi-criteria decision making (MCDM) algorithm that is configured to further prioritize the one or more suggested test repair actions of the test solution priority list by at least querying, by the system, an inventory and production database for a plurality of attributes of each of the one or more suggested test repair actions and narrowing down the one or more suggest test repair actions based at least in part on the plurality of attributes.

6. The computer-implemented method of claim 5, wherein the plurality of attributes for each given test repair action include at least one of a part availability associated with the given test repair action, a repair cycle time associated with the given test repair action, a repair action difficulty associated with the given test repair action, a flag on quality hold associated with the given test repair action, a flag on quality stop shipment associated with the given test repair action, or a product ship date.

7. The computer-implemented method of claim 1, wherein the heat map includes a grid comprising a plurality of color coded cells that are each associated with a different respective operation number and defect code pair.

8. A system for generating test plans based on test failure root causes or symptoms, the system comprising one or more processors configured to perform a method comprising:

generating, by the system, a heat map of manufacturing process test failures based at least in part on historical test failures and prior repair actions, wherein the heat map is presented to a user via a GUI;

receiving, by the system, a user input via the GUI regarding a test failure of a manufacturing process, wherein the user input includes structured and unstructured data;

searching, by the system, a database for test failure records that are relevant to the user input and prioritizing the relevant test failure records via an index score based at least in part on proximity of the relevant test failure records to the user input;

detecting, by the system, failure records from the search having an index score that is higher than a threshold value;

analyzing, by a machine learning engine executing on the system, unstructured text data of each of the detected failure records to identify relevant keywords and respective relevancy rates, the machine learning engine previously trained to input a failure record and to output relevant keywords and respective relevancy rates of the failure record;

generating, by the system, a test solution priority list comprising one or more suggested test repair actions for the test failure based at least in part on the relevant keywords and the relevancy rates; and outputting, by the system, the test solution priority list to the user by at least displaying, by the system via the GUI, the one or more suggested test repair actions in a window that is separate from the heat map.

9. The system of claim 8, wherein generating the test solution priority list comprises:

for each given detected failure record of the detected failure records that includes a relevant keyword of the identified relevant keywords that has a relevancy rate of the identified relevancy rates that is above a threshold relevancy rate, identifying, by the system, a test repair action stored in the given detected failure record; and counting, by the system, a frequency of the test repair action across the detected failure records.

10. The system of claim 8, wherein the method further comprises:

querying, by the system, a feedback repository to obtain feedback data based on the user input, wherein the search of the database for relevant test failure records is further based at least in part on the obtained feedback data.

11. The system of claim 8, wherein the outputting of the test solution priority list via the GUI further comprises:

displaying, by the system via the GUI, at least one of a respective confidence score or respective repair cycle time for each of the one or more test repair actions, wherein the at least one of a respective confidence score or respective repair cycle time is displayed within the window that is separate from the heat map.

12. The system of claim 8, wherein the method further comprises:

executing, by the system, a multi-criteria decision making (MCDM) algorithm that is configured to further prioritize the one or more suggested test repair actions of the test solution priority list by at least querying, by the system, an inventory and production database for a plurality of attributes of each of the one or more suggested test repair actions and narrowing down the one or more suggest test repair actions based at least in part on the plurality of attributes.

13. The system of claim 12, wherein the plurality of attributes for each given test repair action include at least one of a part availability associated with the given test repair action, a repair cycle time associated with the given test repair action, a repair action difficulty associated with the given test repair action, a flag on quality hold associated with the given test repair action, a flag on quality stop shipment associated with the given test repair action, or a product ship date.

14. The system of claim 8, wherein the heat map includes a grid comprising a plurality of color coded cells that are each associated with a different respective operation number and defect code pair.

15. A computer program product for generating test plans based on test failure root causes or symptoms, the computer program product comprising a computer readable storage medium having program instructions embodied therewith, wherein the computer readable storage medium is not a transitory signal per se, the program instructions executable by a system comprising one or more processors to cause the system to perform a method comprising:

generating, by the system, a heat map of manufacturing process test failures based at least in part on historical test failures and prior repair actions, wherein the heat map is presented to a user via a GUI;

receiving, by the system, a user input via the GUI regarding a test failure of a manufacturing process, wherein the user input includes structured and unstructured data;

searching, by the system, a database for test failure records that are relevant to the user input and prioritizing the relevant test failure records via an index score based at least in part on proximity of the relevant test failure records to the user input;

detecting, by the system, failure records from the search having an index score that is higher than a threshold value;

analyzing, by a machine learning engine executing by the system, unstructured text data of each of the detected failure records to identify relevant keywords and respective relevancy rates, the machine learning engine previously trained to input a failure record and to output relevant keywords and respective relevancy rates of the failure record;

generating, by the system, a test solution priority list comprising one or more suggested test repair actions for the test failure based at least in part on the relevant keywords and the relevancy rates; and outputting, by the system, the test solution priority list to the user by at least displaying, by the system via the GUI, the one or more suggested test repair actions in a window that is separate from the heat map.

16. The computer program product of claim 15, wherein generating the test solution priority list comprises:

for each given detected failure record of the detected failure records that includes a relevant keyword of the identified relevant keywords that has a relevancy rate of the identified relevancy rates that is above a threshold relevancy rate, identifying, by the system, a test repair action stored in the given detected failure record; and counting, by the system, a frequency of the test repair action across the detected failure records.

17. The computer program product of claim 15, wherein the method further comprises:

querying, by the system, a feedback repository to obtain feedback data based on the user input, wherein the search of the database for relevant test failure records is further based at least in part on the obtained feedback data.

18. The computer program product of claim 15, wherein the outputting of the test solution priority list via the GUI further comprises:

displaying, by the system via the GUI, at least one of a respective confidence score or respective repair cycle time for each of the one or more test repair actions, wherein the at least one of a respective confidence score or respective repair cycle time is displayed within the window that is separate from the heat map.

19. The computer program product of claim 15, wherein the method further comprises:

executing, by the system, a multi-criteria decision making (MCDM) algorithm that is configured to further prioritize the one or more suggested test repair actions of the test solution priority list by at least querying, by the system, an inventory and production database for a plurality of attributes of each of the one or more suggested test repair actions and narrowing down the one or more suggest test repair actions based at least in part on the plurality of attributes.

20. The computer program product of claim 19, wherein the plurality of attributes for each given test repair action include at least one of a part availability associated with the given test repair action, a repair cycle time associated with the given test repair action, a repair action difficulty associated with the given test repair action, a flag on quality hold associated with the given test repair action, a flag on quality stop shipment associated with the given test repair action, or a product ship date.

* * * * *

UNITED STATES PATENT AND TRADEMARK OFFICE
CERTIFICATE OF CORRECTION

PATENT NO. : 10,761,974 B2
APPLICATION NO. : 15/808972
DATED : September 1, 2020
INVENTOR(S) : Brad Hoover et al.

It is certified that error appears in the above-identified patent and that said Letters Patent is hereby corrected as shown below:

On the Title Page

Item (72) Inventors: Column 1, Line 5, should read as follows:
Bradley Joseph Hoover, Austin, TX (US);
Rajaram B. Krishnamurthy, Pleasant Valley, NY (US);
Michael Lapointe, Saugerties, NY (US);
Jayapreetha Natesan, Hopewell Junction, NY (US);
Kanayo G. Okonji, Wappingers Falls, NY (US);
Chanchal Saha, Beacon, NY (US);
Thomas Ward, Highland, NY (US)

Signed and Sealed this
Third Day of November, 2020

Andrei Iancu
*Director of the United States Patent and Trademark Office*